United States Patent [19]

Bernardo

[11] Patent Number: 5,330,246
[45] Date of Patent: Jul. 19, 1994

[54] SLAT BLOCK AND GUIDE TRACK APPARATUS FOR ROLLING TRUCK BED COVER

[76] Inventor: Richard G. Bernardo, 2350 NE. 29th St., Lighthouse Point, Fla. 33064

[21] Appl. No.: 978,110

[22] Filed: Nov. 18, 1992

[51] Int. Cl.$^5$ .............................................. B60P 7/02
[52] U.S. Cl. ...................................... 296/98; 160/130
[58] Field of Search ................... 296/98, 100; 160/133, 160/232, 235, 236

[56] References Cited

U.S. PATENT DOCUMENTS

| | | | |
|---|---|---|---|
| 546,858 | 9/1895 | Kinnear | 160/232 |
| 2,954,081 | 9/1960 | Recchione | 160/235 X |
| 4,921,033 | 5/1990 | Finch et al. | 160/133 |
| 5,040,843 | 8/1991 | Russell et al. | 296/98 |
| 5,154,468 | 10/1992 | Teigen et al. | 160/133 X |

FOREIGN PATENT DOCUMENTS

| | | | |
|---|---|---|---|
| 3529043 | 2/1987 | Fed. Rep. of Germany | 160/133 |
| 262801 | 2/1929 | Italy | 160/133 |
| 2011512 | 7/1979 | United Kingdom | 160/133 |

Primary Examiner—Dennis H. Pedder
Attorney, Agent, or Firm—Malin, Haley, DiMaggio & Crosby

[57] ABSTRACT

A water resistant, retractable slatted rolling truck utility bed cover for jam-free and noise-free operation. A slat end block is permanently attached to each slat end, the slats being hinged in a side-by-side array forming the cover body. The blocks reduce vibration, eliminate thumping noise and improve the sliding action of the cover body by acting as an end bearing surface. The bottom surface of each slat block includes an arcuate curvature along the length thereof that, when used in conjunction with sloping passageway entrance of the guide tracks, provides a simplified non-jam closure. Each slat block includes grooves to divert water to the guide tracks away from the truck bed interior.

8 Claims, 3 Drawing Sheets

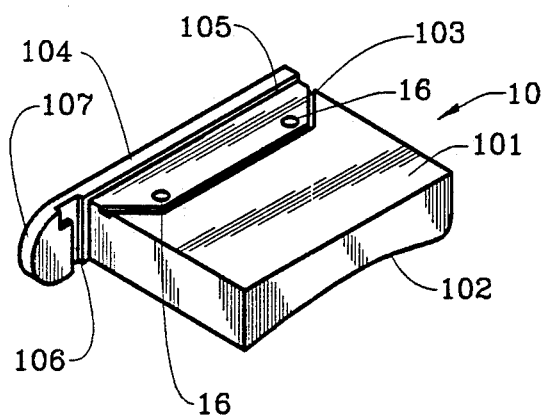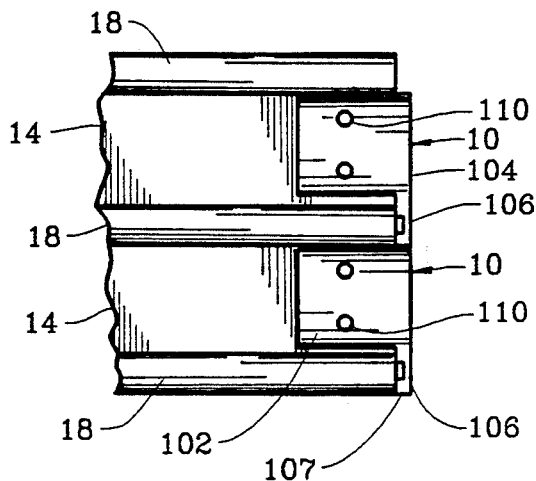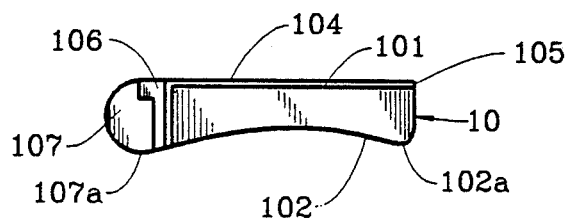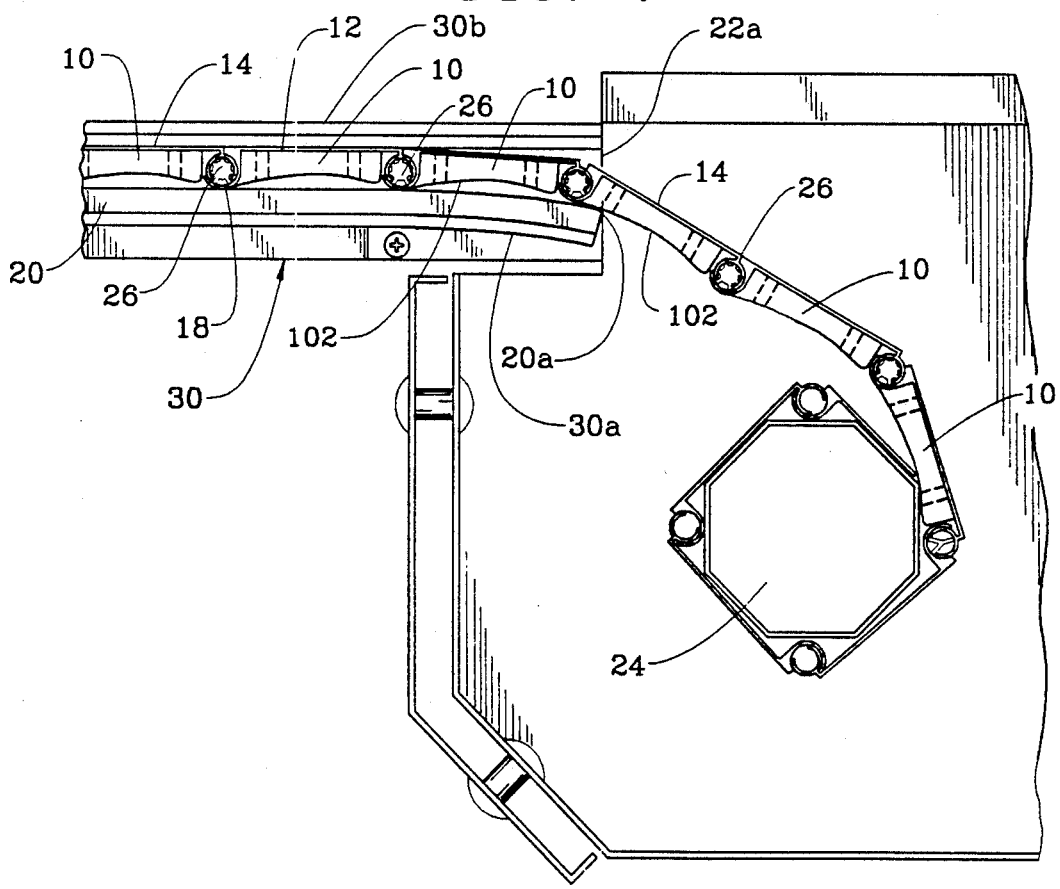

SLAT BLOCK AND GUIDE TRACK APPARATUS FOR ROLLING TRUCK BED COVER

BACKGROUND OF THE INVENTION

1. Field of the Invention

This invention relates generally to slatted rolling truck utility bed covers and, in particular, to an improved slat block and guide track apparatus for use in combination with a retractable rolling cover of a pickup truck utility bed.

2. Description of the Prior Art

Truck bed covers are well known consumer items used to protect a truck's utility bed and items placed therein. By securing a cover to the side rails of the truck bed, an enclosure is formed capable of protecting items placed therein against theft and exposure to the elements. The cover provides an aerodynamic profile and, depending upon the overall shape and profile, enhances gasoline mileage.

Retractable or rolling covers mounted on a roll up reel mechanism are known for their ability to securely cover the utility bed of a pickup truck. A rolling cover is comprised of elongated plastic or metal slats hinged together along top and bottom edges and disposed between a pair of parallel, opposed guide tracks, anchored to opposite sides of the utility truck bed walls. One end of the retractable cover is connected to a rotatable reel about which the cover can be rolled. Disadvantages of the construction of the prior art are that the rolling cover can leak water from rain and often is susceptible to lateral dynamic vibrations and lateral drag. Other problems are that the bottom profile of each slat can often cause jamming at the entrances to the guide tracks during closing of the cover over the bed and a thumping noise when the cover is moved in either direction.

U.S. Pat. No. 4,807,921 issued to Champie, discloses a sliding cover for truck beds which uses runner tracks permanently anchored to the truck bed. Champie discloses the use of metal slats that extend across the truck bed and are supported along the bottom by rubber grommets that assist in directing water through the guide track and outboard of the truck bed. The problem with the Champie device is that the side and upper enclosure of the slats have no mechanism to prevent rattling or to prevent jamming at the juncture of each of the interconnected slats.

U.S. Pat. No. 4,784,427 issued to Burgess discloses a tension wound cover for maintaining truck roller slats in a rigid position but also does not address jamming of the shutters during the opening and closing thereof. Burgess employs a rail which permanently attaches to the truck for securing of the cover. Burgess discloses the use of guide tracks that have C-shaped runners to help prevent rattling of the slats in a longitudinal and vertical position. The Burgess device is complicated, relying upon tension for proper operation.

U.S. Pat. No. 4,889,381, issued to Tamblyn et al. Dec. 26, 1989, and U.S. Pat. No. 4,611,848 issued to Romano Sep. 16, 1986, show a retractable truck bed cover using wheels attached to the slats, which increase cost, maintenance, and possibilities of jamming.

The instant invention addresses the aforementioned problems by providing a slat block and guide track system for use in conjunction with horizontally disposed, retractable rolling slats of a truck utility bed to provide water resistant, jam and rattle-free construction in a cost effective system.

SUMMARY OF THE INVENTION

A slat block and guide track apparatus is provided for use with a retractable, rolling truck utility bed cover. The truck bed cover body is comprised of a plurality of rigid slats joined together in a hinged, relatively pivotal, side-by-side array. The ends of the slats on both sides are slidably mounted within a pair of elongated guide tracks, each having a lower plastic runner upon which the slat ends rest by gravity, disposed in parallel relation to one another on the upper portion of the truck utility bed sidewalls. The cover body is connected at one end to a spring-actuated, roll-up reel which in turn is attached to a reel housing secured to the front area of the pickup truck utility bed. The cover body can be manually rolled up and stored in the reel housing or manually extended to completely cover the truck bed or predetermined areas thereof along the guide tracks.

Each slat is a thin, rigid, elongated plastic or metal (preferably aluminum) strip substantially rectangular with partially circular, interlocking channels of concentrically different diameters along the longer edges. The channels form hinges which permit pivotal movement between adjacent slats for roll up purposes. The smaller diameter (inner mounted) channel includes a resilient (rubber or plastic) weather strip having bifurcated flanges to prevent moisture from penetrating through the hinge areas. Rain water striking the top of the cover body, is deflected laterally along the hinges until reaching the slat ends where water entering the hinge areas is diverted into the guide track for removal by the slat end blocks described herein.

Each slat end has connected thereto a slat block constructed of a one piece, molded plastic member for rigid connection at the end of and against a portion of the bottom side of each slat, the slat block providing contoured surface areas for slidable contact with the lower runner in each guide track entrance and water diversion into the guide tracks away from the interior bed. The slat blocks (two for each slat, one at each slat end) have exposed flat end cap surfaces that can contact as a bearing surface the guide track inside wall laterally to limit lateral movement of the body cover from side to side, the spacing being very small. The slat blocks are configured for left and right usage as mirror images and are identically sized in length, width, thickness and contour to fit below the open end of each slat between the interlocking hinge channels for a snug fit. Each slat block has an exposed bottom arcuate surface that provides a smooth arcuate contact area for smooth movement of the slat ends as each slat enters or exists the guide track entrance on each side.

In particular, the slat blocks of the instant invention are for use in combination with the slats of the retractable rolling cover as fully disclosed in Applicant's copending U.S. patent application entitled "ROLLING COVER FOR A TRUCK UTILITY BED HAVING IMPROVED REEL SUPPORT HOUSING AND GUIDE TRACK CLAMPS" filed on Jul. 30, 1992 under Ser. No. 07/922,745, now U.S. Pat. No. 5,252,950, the disclosure of which is fully incorporated herein.

The slat block in accordance with the present invention provides many integrated functions to improve the operation and use of the rolling cover. Each slat block includes a vertical channel for diverting water away from the top of the cover body down into the guide tracks where it is disposed of without entering the truck bed itself and a top lateral water diverting channel that also prevents water from entering the seam between the slat body edge and the slat block edge, again preventing water from entering the truck bed. The water diverting channel is a groove along the top surface of the slat block near the cap end which runs from one top edge of the slat block to the opposite side edge. Water received in the slat block channel travels to the block edge where it falls by gravity into the guide track below and drains without entering the truck bed.

The slat blocks also provide for smooth contact between the slat block bottoms and the guide track entrance. The arcuate shaped exposed bottom surface of each slat block provides a sufficiently smooth surface area for continuous contact between the slat blocks and the lower guide track runner at the entrance so that movement of the slats into and out of the guide track entrance is jam-free and noise-free. The arcuate shape and profile of the bottom surface of each slat block also provides sufficient curvature to accommodate proper clearance at the transition entrance into each guide track passageway to prevent jamming and thumping noises. The slat block bottom bridges the space between the slat edge hinges which would otherwise hang up or thump against the guide track entrance. Each guide track entrance lower runner diverges angularly downwardly to work in conjunction with the slat block arcuate shape so that the angle of the cover body between the reel and the entrance to the guide track in conjunction with the arcuate shape of the slat block prevents jamming when the cover is unrolled for continuous movement as the cover enters each guide track on each side. The lower vinyl runner mounted in the guide track engages the lower surface of each slat guide providing non-metal contact to reduce, if not eliminate, rattling and thumping noises. Each guide track has a horizontally disposed C-shaped channel that receives the slat block end caps which limit lateral movement of the cover body.

The slat blocks provide for jam-free, noise-free transition of the slatted body of the bed cover body into and out of the guide tracks. The slats pivot relative to each other to allow the cover body to be rolled about the reel. The cover body path drops angularly toward the reel between the guide track entrance and the reel as the cover body nears the end attached to the reel. The arcuate bottom surface of the slat block has curved surface areas that ride on the lower guide track runner to eliminate "thumping" sounds. Each slat block vertical end cap surface is spaced about one-eighth inch from the inside guide track vertical wall to prevent excessive independent lateral movement of the cover body to prevent vibration noise which, heretofore, was often prevented with the insertion of a screw fastener into the inner hinge section at the end of each interlocking pair of slats. The fastener provided no bearing surface nor did it address the problem of slat entry into the guide tracks. The slat block end cap vertical surface acts as a bearing surface against the guide track for noise-free, reduced friction movement.

To prevent jamming at the entrance to the guide track on each side, the slat blocks have a predetermined arcuate profile to move by the guide track angularly diverging downward entrance near the reel housing. The guide track entrance accommodates the arcuate curvature of each slat end guide to provide a smooth transition of the bed cover to the guide tracks. The protruding hinge channels of the slats do not snag or hang up on the guide track entrance regardless of the direction of movement of the slats for opening or closing the bed cover. The slats can be tightly rolled about the storage reel allowing for a smaller storage area thus providing additional room in the utility bed when the bed cover body is stored in the reel housing.

Accordingly, an object of this invention is to provide improved truck bed cover slat blocks that are used in conjunction with parallel guide tracks to provide a jam-free and noise-free apparatus for use with retractable utility bed covers.

Another object of the invention is to provide arcuately-shaped slat blocks that, when mounted to the ends of slats of a utility bed cover, work in conjunction with the guide track entrances allowing the cover to be moved and rolled on a reel in both directions without jamming or making a thumping noise.

Yet another object of the invention is to provide a slat block for a rolling truck bed cover that prevents water from reaching the truck bed interior, in a cost effective system of high reliability.

In accordance with these and other objects which will be apparent hereinafter, the instant invention will now become described with particular reference to the accompanying drawings.

BRIEF DESCRIPTION OF THE DRAWINGS

FIG. 1A is a perspective view of a slat block used with the invention.

FIG. 2 is a bottom plan view, partially cutaway, of one end of the truck bed cover, showing a pair of slats, slat ends, and a pair of slat blocks connected together, wherein the slats are interlocked in a hinged manner.

FIG. 3 is an end view in elevation of the slat block shown in FIG. 1, taken from the narrower end view.

FIG. 4 is a side elevational view, partially in cross section, of a portion of the truck bed cover, mounted on a reel contained in the reel housing and showing one guide track entrance at the reel housing.

DESCRIPTION OF THE PREFERRED EMBODIMENTS

Figure 1:
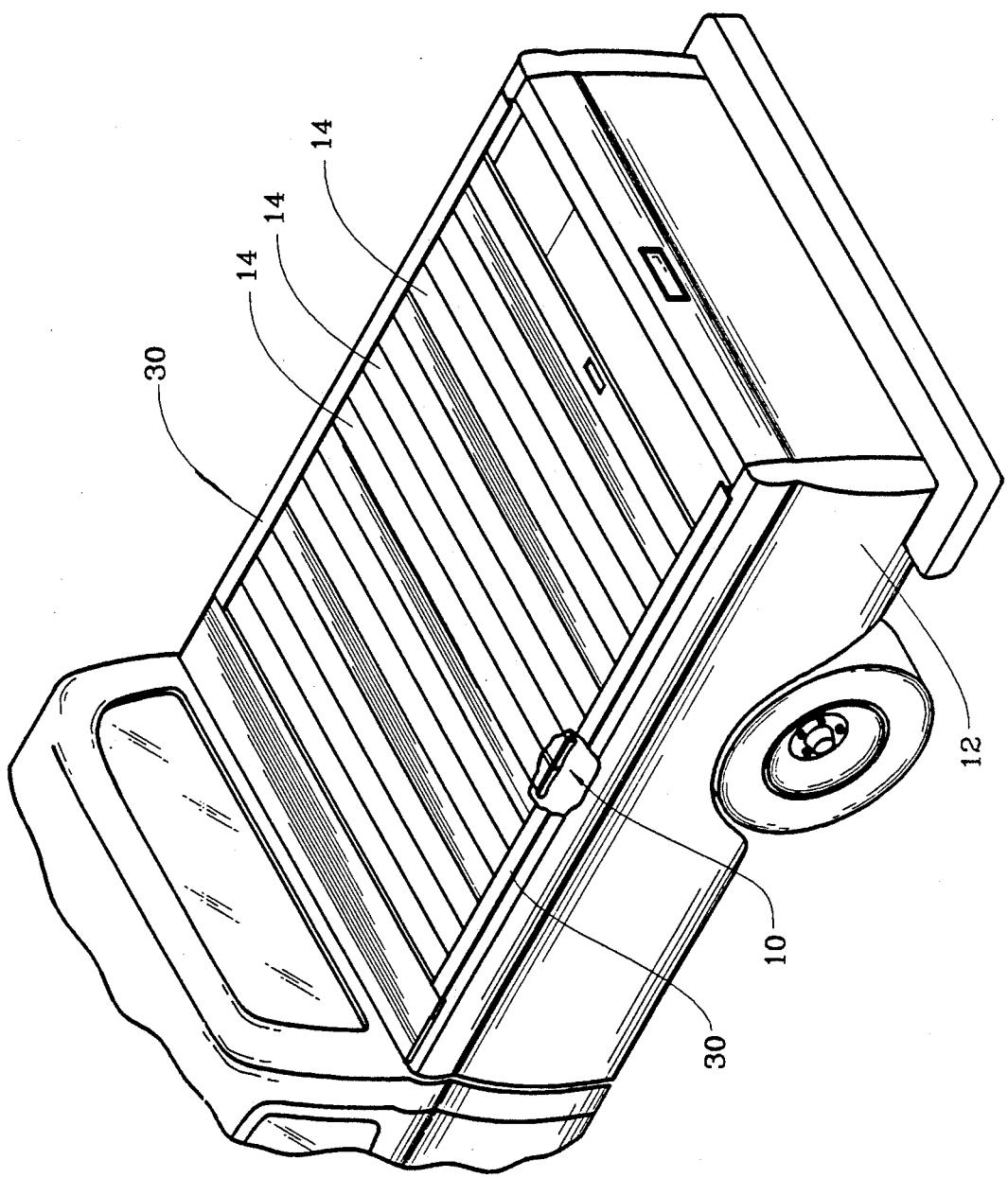
FIG. 1 shows a perspective view of a rolling truck bed cover partially cutaway to show slat blocks utilized in accordance with the present invention.

Referring now to the drawings and in particular FIG. 1, a truck bed cover in accordance with the present invention is shown, comprised of a plurality of slats 14, each slat end having attached thereto a slat block 10 which is mounted inside guide track 30 connected to the truck walls 12.

Each slat 14 is essentially a thin ($\frac{1}{4}$") metal or rigid plastic strip which is elongated and sized to reach from one side of the truck bed to the other laterally. Along each sidewall of the truck bed are mounted a pair of guide tracks 30 that are connected to the truck bed walls 12 as described in my previous patent application cited above. Each slat 14 has integrally formed therein, two different hinge members on the leading and trailing edges, each of which interlocks pivotally with an adjacent slat 14 in a side-by-side array. A resilient seal (water resistent) is placed in each inner hinge channel, which is described in more detail below.

As shown in FIG. 1A, the slat end block 10 includes a lower arcuate surface 102 and a flat upper surface 101. A water diverting channel 103 is formed by a longitudinal groove that runs from the leading edge to the trailing edge of the slat block 10 near apertures 16 which receives screws or rivets to attach the slat block 10 to a slat end not shown in FIG. 1A. The slat block 10 also includes an extended end cap 104 having a curved forward extending end 107 which conforms and aligns with the hinge interlocking adjacent slats covering the inner and outer hinge passages which are interlocked. A vertical channel 106 is used for diverting water downwardly into the guide track below as water moves laterally across the upper surfaces of hinge members to the outer ends of the slats. A raised lip 105 defines the inner block upper surface 101 from an outer cap raised surface 104, the lip portion 105 being substantially the thickness of the slat body so that when the slat block is placed adjacent and flush with the bottom surface of the slat, the top surface of the slat and the end block cap 104 are flush. The leading and trailing end portions of the lower arcuate surface 102 provide contact points for the guide track lower runner, as described in more detail below.

The slat block water diverting channel 103 prevents water that may seep in between the end cap upper surface 104 and an upper surface of the slat body seam along lip 105. Water cannot pass groove 103, but enters into the groove 103 and is transferred out either end of the groove into the guide track below and away from the truck bed.

FIG. 2 shows a pair of slats 14 joined together along the leading and trailing edges by hinges 18 and having a pair of slat blocks 10 attached to the slats 14 by rivets 110. The vertical water diverting channel 106 is shown near the end faces of the hinges 18. Channel 106 prevents water from being trapped in the hinge and provides for water divergence into the guide track below.

FIG. 3 shows an end elevational view of the slat block 10 shown in FIG. 1. Note that the bottom surface 102 profile conforms to the end surface profile of end cap 104 as shown in FIG. 1A. The slat block 10 also includes lower surface areas 107a and 102a which provide surface contact areas that allow the slat block to smoothly engage the lower runner surface smoothly at the guide track entrance. The vertical water diverting channel 106 is also shown that allows water to flow by gravity into the guide track channel.

FIG. 4 shows a part of the truck bed cover having one end attached to a rotatable, spring-actuated (not shown) reel 24. The truck cover guide track housing 30 is shown which is used on one side of the truck bed wall and which receives the slat ends and the slat block 10. Elongated plastic seals 26 are shown mounted in circular hinges 18 which are constructed of interlocking covered end channels to allow pivotal movement of adjacent slats. The lower track of the track guide 30a is mounted on the truck wall and includes a groove therein which holds a vinyl or plastic runner 20, upon which the slats glide whenever the truck bed cover is opened or closed. The lower runner entrance 20a is sloped downwardly relative to the upper guide track runner 20 at the entrance to the guide track in conjunction with the bottom arcuate surface 102 of each slat block 10 to provide smooth contact transition when the truck bed cover is moved (especially inwardly for closing the cover) so that the hinge members 18 do not jam or thump and the block surface 102 does not scrape along the entrance opening 20a.

Figure 5:
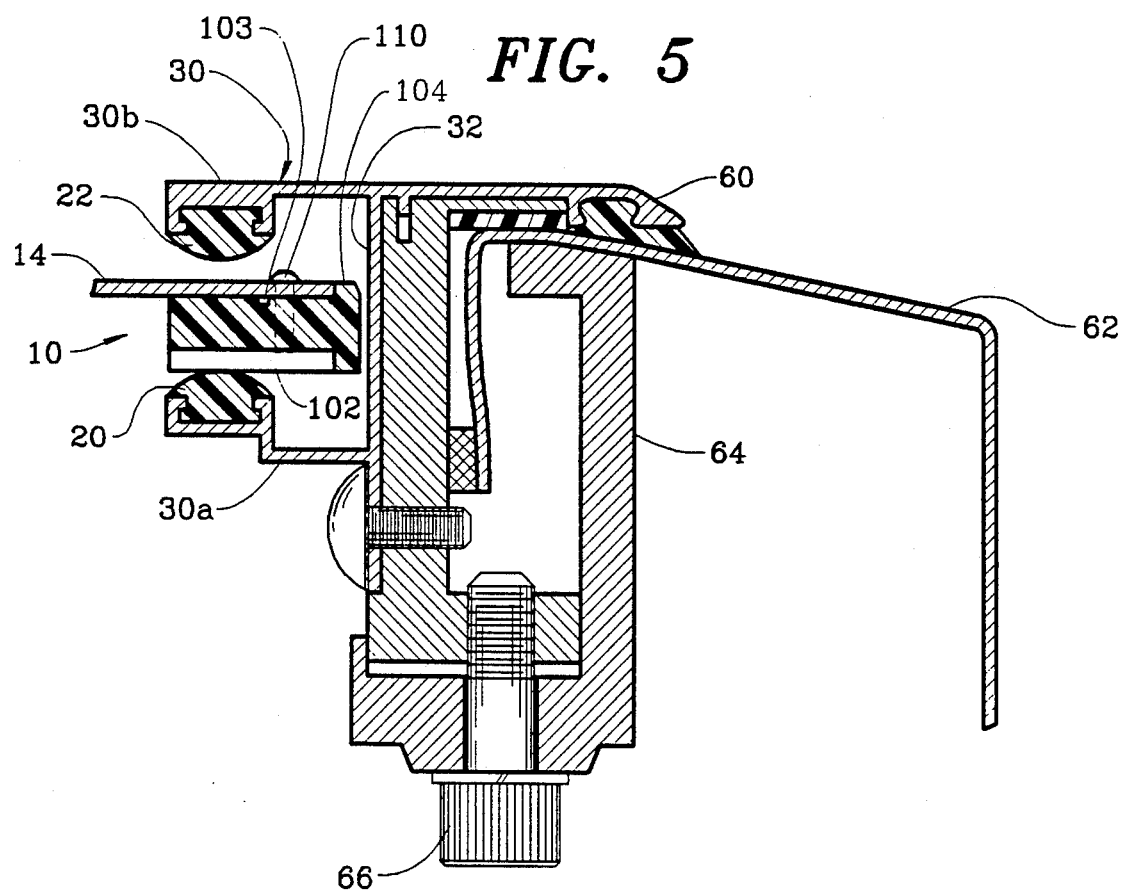
FIG. 5 is a front, cross sectional view of one guide track and clamp apparatus used with the truck bed and a portion of one slat block and slat end resting on the lower runner in the guide track.

FIG. 5 shows the slat block 10 connected by rivet 110 to slat end 14. Note how the slat block end cap 104 is spaced very close to vertical guide track wall 32 so that there is minimal independent lateral movement of the entire cover. The end vertical face or surface of the slat block which is plastic acts as a bearing surface when contacting the vertical wall 32. Also note the C-shaped channel in the guide track housing defined by upper wall 30b, side wall 32 and the lower surface 30a which receives water that drops from the water diverting groove 103 for removal so that water will not reach into the truck bed housing. An upper vinyl runner 22 is also provided to prevent upward movement. As shown in FIG. 5, the entire guide track assembly is attached to a truck sidewall 62 as described in my previous patent application.

Figure 6:
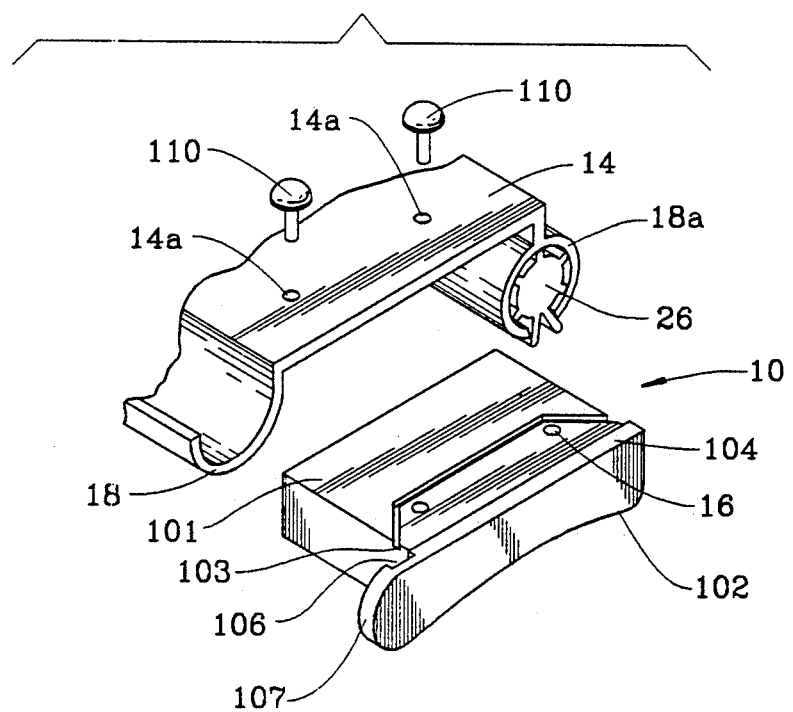
FIG. 6 is a perspective view of a slat end and the slat block exploded.

FIG. 6 shows how the slat blocks 10 which are made as left and right and in mirror image of each other fit into the slat end so that the curved protruding portion of the slat block end 107 extends and covers over the curved hinge larger diameter channel 18 which receives an adjacent slat smaller curved hinge portion 18a. Rivets 110 fit into the holes 14a in slat 14 and also into the hole 16 in the slat block 10. The rigid slat body is sized in width to extend at least one inch inwardly from end of slat 14.

Utilizing the slat block, slat construction and guide tracks in accordance with the present invention, the slat block accomplishes water diversion to prevent water from being received into the truck bed, jam-free operation when opening and especially closing the truck bed cover at the entrance to the guide tracks and noise-free, vibration-free operation as the cover moves along the guide track runners and also, independent lateral movement is prevented without metal-to-metal contact or noise.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A slat block for use with a slat in a rolling, retractable truck bed cover, said cover made from a plurality of elongated slats, each slat having a pair of slat ends, a slat surface bottom, and a slat surface top, said slats having hinges, each hinge terminating at each end in a hinge end on opposing longitudinal sides that interlock, said slats interconnected in a side-by-side array for covering the utility bed of a pickup truck and slidably mounted in parallel guide tracks attached to opposing truck bed walls, each guide track having an entrance, comprising:

a rigid body sized in length for mounting between adjacent slat hinges, sized in width to extend at least one inch inwardly from a slat end, and sized in thickness to extend from the slat surface bottom in predetermined areas to at least the extent of a hinge thickness, said slat block including an end cap at one end integrally formed with said rigid body and extending beyond a portion of said rigid body in length and sized and contoured to cover said hinge end and the slat end whereby said slat block acts as a bearing surface for lateral restraint of independent movement and as a guide for smoothing the movement of the truck bed cover into and out of each guide track entrance;

said rigid body having an upper flat surface, a lower surface having a curved central portion, said end cap having a flat end face, said rigid body cured lower surface sized in curvature and length to provide smooth contact between said slat block and said guide track entrance to prevent jamming of said truck bed cover when said truck bed cover is moved relative to said guide track entrance.

2. A slat block as in claim 1, including:

means in said slat block for diverting liquid such as water received on top of said truck bed cover into said guide tracks to prevent liquid from being received into the truck bed body interior.

3. A slat block as in claim 2, wherein:

said means for diverting a liquid includes a groove extending from one side to the opposite side of said rigid body.

4. A slat block as in claim 1, including:

said rigid body flat upper surface having a groove extending from one side to the opposite side for diverting water, and said rigid body having at least one aperture for receiving a fastener so that said aperture is disposed between said rigid body flat upper surface groove and the end cap of said slat block.

5. A roll-up track bed cover comprising:

a plurality of elongated rigid slats each slat having a pair of ends and hinges, said slats hingedly connected in a side-by-side array forming a cover body that can be rolled up, said hinges protruding downwardly from the slat body surfaces;

a plurality of rigid slat blocks each having an end cap, one of each slat block connected at each end of a slat;

a pair of parallel guide tracks each having a substantially C-shaped channel, one of each mounted on opposite sides of the truck bed for receiving the slat blocks and slat ends, said guide track including a lower disposed plastic runner from end to end;

each of said slat blocks including an upper flat surface and a lower curved surface adjacent said end cap, said slat block including a groove in said slat block body for diverting water to prevent water from penetrating the truck bed cover body when the cover is in a closed position, said slat block end cap having a flat exterior wall surface that acts as a bearing surface against said guide track channel to prevent excessive independent lateral movement, whereby said guide tracks each having an entrance portion, said lower curved surface of each of said slat blocks permitting smooth contact to prevent jamming of said slats when slat ends are moved into said guide track entrance.

6. A device as in claim 5, including each of said slat blocks being made of molded plastic and being attached to said slats so that lateral contact between said slat blocks and said guide tracks is plastic to metal as a bearing surface for smooth noise free operation.

7. A device as in claim 5, wherein said entrance to said guide track has a lower sloping runner.

8. A rolling truck bed cover as in claim 5, including:

each of said slat blocks having a vertical channel for diverting water on said truck bed cover and a lateral groove in the upper block surface to divert water to said guide tracks away from said truck bed.

* * * * *